(12) United States Patent
Resman

(10) Patent No.: US 6,459,424 B1
(45) Date of Patent: Oct. 1, 2002

(54) TOUCH-SENSITIVE INPUT SCREEN HAVING REGIONAL SENSITIVITY AND RESOLUTION PROPERTIES

(75) Inventor: Mark F. Resman, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/371,159

(22) Filed: Aug. 10, 1999

(51) Int. Cl.$^7$ ................................................ G09G 5/00
(52) U.S. Cl. ...................................................... 345/173
(58) Field of Search ................................ 345/173, 174, 345/132, 901, 902, 600, 475, 698, 699; 178/18.01, 18.05, 18.06, 18.07, 18.03

(56) References Cited

U.S. PATENT DOCUMENTS

| | | | |
|---|---|---|---|
| 4,013,835 A | 3/1977 | Eachus et al. | 178/18 |
| 4,698,461 A | 10/1987 | Meadows et al. | 178/19 |
| 5,122,787 A | 6/1992 | Fujita et al. | 340/712 |
| 5,194,862 A | 3/1993 | Edwards | 341/20 |
| 5,543,589 A * | 8/1996 | Buchana et al. | |
| 5,777,596 A | 7/1998 | Herbert | 345/104 |
| 5,847,690 A | 12/1998 | Boie et al. | 345/104 |
| 5,861,875 A | 1/1999 | Gerpheide | 345/174 |
| 5,920,327 A * | 7/1999 | Seidensticker, Jr. | |
| 5,943,052 A * | 8/1999 | Allen et al. | |
| 6,184,864 B1 * | 2/2001 | Chao | |

* cited by examiner

*Primary Examiner*—Chanh Nguyen

(57) ABSTRACT

A touch screen panel having varied region-specific combinations of resolution and touch sensitivity may also incorporate display functionality. For a first embodiment of the invention, the majority of the screen area exhibits low resolution, high touch force characteristics. A smaller area of the screen exhibits low touch force and high resolution properties. For a second embodiment of the invention, at least a portion of the peripheral regions (i.e., regions near the circumferential edge) of the screen are provided with regions of low touch force high resolution properties. These regions may be programmed to act as scroll bars, which would allow the user to change locations in a document of which only a portion is displayed on the screen. In the central regions of the screen, higher touch force and lower resolution provide palm rejection and coarse marking or movement capability with low bandwidth utilization. Either the varied screen properties may be incorporated into the screen during its manufacture, or the screen may be designed so that different resolution and touch sensitivity properties can be assigned to different regions of the screen to suit the user's needs.

23 Claims, 3 Drawing Sheets

TOUCH-SENSITIVE INPUT SCREEN HAVING REGIONAL SENSITIVITY AND RESOLUTION PROPERTIES

FIELD OF THE INVENTION

This invention relates to input screens and combined input/display screens for inputting and/or displaying graphic information in connection with a data storage and/or data processing system.

BACKGROUND OF THE INVENTION

Touch-pad display screens have found wide application in Personal Digital Assistants (PDAs), ultra-compact personal computers, with built-in operating systems, that are optimized for scheduling and other high-mobility operations. During the past several years, the popularity of PDAs has soared. Corporations such as Sharp, Casio, Philips, 3-Comm, and Hewlett-Packard have entered the fray. Most have flash memory, a small liquid-crystal-display touch-pad screen, a user input device which may be either a barely-usable, miniature keyboard, and/or a touch pad incorporated into the screen, as well as a communications port for transferring files between the PDA and a less-portable computer. A high-end PDA may incorporate a modem and communications software, as well as drawing, word-processing and spreadsheet software. A writing stylus, or "pen", may be supplied, with which the user may write and draw on the touch-pad screen. The PDA may also be equipped with a menu system which requires low-resolution inputs, thereby allowing the user to simply touch the screen at selected touch key locations with his finger to select menu options. The touch-pad feature has great utility on a PDA, as nearly all PDAs are too small to incorporate a keyboard large enough for efficient touch typing. Thus, handwriting and drawings are initially stored as bit-mapped patterns. With writing recognition software that is supplied with many of the PDAs, a user's handwriting can be converted to ASCII text. Compared with desk-top and lap-top computer systems, PDAs generally have very limited memory storage capabilities. However, the average amount of memory being supplied with PDAs is growing rapidly. Already, PDAs with 16 megabytes of flash memory are available. As it becomes possible to load an entire novel or textbook into the memory of a PDA, it is likely that they will find wide use as electronic editing and annotation devices.

Lap-top computers are equipped, almost exclusively, with LCD displays. Within the past year, flat screen displays utilizing LCD technology have become sufficiently inexpensive that they are beginning to replace cathoderay-tube (CRT) displays used with desk-top systems. Because touch-pad functionality can be readily incorporated in an LCD display, it is likely that large numbers of both lap-top and desk-top systems will soon incorporate LCD display screens with touch-pad functionality. The incorporation of touch pad functionality promises to facilitate rapid user interaction with the computer system. For example, the computer system may be programmed to initiate a particular task when a certain letter is drawn with a finger tip or stylus on the touch pad. An additional example is the programming of the computer system so that the edges of the touch pad mimic on-screen scrollbars. A touch pad will also permit the user to enter data in handwriting and to sign documents with a bit-mapped copy of his signature. With the availability of touch-pad systems, electronic editing and annotating of documents will become much more widespread. There is little doubt that the incorporation of touch-pad functionality will greatly enhance the flexibility of personal computer systems. The incorporation of the touch pad feature in a desktop system is expected to reduce the frequency of repetitive motion injuries, as little arm or wrist motion is required.

Many different types of devices presently exist which utilize tactile sensing to provide inputs to a data processing system. These devices sense the position of a finger or stylus at successive intervals on a touch sensitive surface. The touch detection mechanism typically relies on localized changes in either conductivity or capacitance from a reference value caused by the presence of the finger or stylus on or near the touch sensitive surface. A touch screen display typically has both horizontal and vertical scanning circuitry. The location and direction of a touch input is determined during the periodic scanning of both horizontal and vertical screen elements. For example, if a screen has 600 elements arrayed vertically along the screen's horizontal axis and 400 elements arrayed horizontally along the screen's vertical axis, a capacitive change from a standard value at the intersection of any horizontal element and a vertical element will indicate a touch input at the intersection location.

In U.S. Pat. No. 4,013,835 to Eachus, et al., a touch pad is formed from a layer of a variable-resistance material, such as a silicone rubber membrane embedded with silver particles, which overlies a first set of parallel conductor strips which, in turn, overlie a second set of parallel conductor strips. Each conductor strip of the first set incorporates a plurality of serially-connected, open rectangles. Each rectangle surrounds a center conductive island which is in permanent contact with a conductor strip of the second set. When the membrane is compressed in the area of an open rectangle by pressure exerted by a finger or stylus, the membrane becomes conductive in the compressed region, and electrical contact is made between the rectangle and the surrounded island. Position can be determined by sequentially scanning the both sets of conductor strips at the periphery of the touch pad and determining current flow from a conductor of the first set to a conductor of the second set. Up to a maximum value, current flow will increase with pressure.

In U.S. Pat. No. 4,698,461 to Meadows, et al., a touch panel incorporates an upper layer of uniform resistivity. Panel scanning signals are applied to excite selected touch surface edges so as to establish an alternating current gradient across the panel surface. When the surface is touched, a current flows from each excited edge through the resistive surface and is either capacitively or conductively coupled to earth ground potential through the user's finger and body. As resistance increases with the distance from the edges of the panel, the touch location can be determined by measuring the current flows during the scanning process.

Cirque Corporation, a company noted for its touch-pad sensing devices, has received several patents covering the technology which descend from U.S. application Ser. No. 7/914,043 filed by Gerpheide, et al. On Jul. 13, 1992. One of the latest of these is U.S. Pat. No. 5,861,875. A touch-sensitive pad includes a plurality of capacitive elements formed by two perpendicularly-overlapping, dielectrically-insulated arrays of parallel electrode strips. The capacitive coupling of an object, such as a finger or stylus, to the capacitive elements is sensed to determine the object's horizontal and vertical (x and y) position with respect to the touch surface of the pad. This device is of interest because capacitive balance measurement circuitry and capacitive balance ratio determination circuitry have been included which increase position detection resolution beyond an object's coarse position, which is a function of the separation of the parallel electrode strips within the two arrays. In addition, the circuitry provides for a determination of the vertical proximity of an object to the touch pad so that a determination can be made as to whether or not a determination of the x and y position is meaningful.

In U.S. Pat. No. 5,194,862 to Edwards, a sensor array system includes a row and column array of individual sensing elements, each of which has a bistable circuit which adopts one or the other of two stable states depending on whether or not a touch input (made by either a stylus or finger) exists at the sensing element location. The rows of sensing elements are periodically reset in sequence by a scanning address circuit and the states of their bistable circuits are determined at regular intervals related to resetting by a detection circuit using active matrix addressing of the sensing elements. The array of sensing elements is fabricated using thin film transistor technology. The system can be used as an overlay to a display device such as a matrix liquid crystal display screen.

U.S. Pat. No. 5,122,787 to Fujita, et al., discloses a ferroelectric liquid crystal touch panel that includes two mutually perpendicular sets of parallel electrodes arrayed in spaced-apart parallel planes. A ferroelectric liquid crystal positioned between the electrodes at the intersection of each electrode pair. The location of touch inputs on the panel are determined by scanning peripheral circuitry which detects electromotive forces which are generated when a ferroelectric crystal is compressed by a touch input.

A different approach is taken by U.S. Pat. No 5,777,596 to Herbert. Touch inputs made with a finger or stylus on a liquid crystal display are detected by scanning circuitry, which continuously compares charge times of the constituent liquid crystal elements to a reference value. The results of the comparison determine which elements in the display are being touched.

The combination display and sensing device of U.S. Pat. No. 5,847,690 to Boie, et al., incorporates modified liquid crystal display elements a black matrix layer adapted for sensing screen touch locations. A scanned electrical signal applied to the display elements produces an output signal indicative of a touched location on the screen.

Touch-sensitive display screens almost invariably require conductive circuit elements to be embedded within the display panel itself. Either these elements must be so delicate that they do not substantially interfere with the transmission or reflection of light, or they must be transparent. Indium tin oxide is one of the few known transparent solid materials. As such, it has found widespread use in the manufacture of liquid crystal displays having touch-sensitive input capability.

Display screens incorporating touch pad functionality are manufactured for a wide variety of applications. Manufacturers design the properties of the touch screen to meet certain needs of the consumer. Two properties which may vary from one screen to another are resolution and touch sensitivity.

Resolution may be defined as the ability of the screen to resolve two nearby points on the screen. It can also be defined as the smallest area on the screen surface recognizable as a single point or pixel. Low-resolution screens would be adequate, or even desirable, for certain applications such as region selection, check boxes, or highlighting portions of displayed documents. High-resolution screens would be desirable for sketching, handwriting input, digital signatures, and any other task where precise, smoothly drawn lines are required. A drawback of a high resolution screen is that greater processing power is required to manage the resulting greater data input.

Touch sensitivity, on the other hand, refers to the amount of pressure applied to the screen surface that is required to activate a pixel. A high level of touch sensitivity (i.e., pixels are activated with low applied pressure) is useful when a high level of dexterity is required for a given task. Sketching or handwriting, for example, are best registered on a screen having high touch sensitivity. Screens possessing low touch sensitivity (i.e., pixels are activated with high applied pressure) are less likely to register a touch from either inadvertent touching or from resting the palms of the hands on the screen.

What is needed is a touch screen having varying combinations of resolution and touch sensitivity for different applications. Different combinations of these two properties will enhance the functionality of the user interface and will optimize inputs for a particular task.

SUMMARY OF THE INVENTION

This invention includes a touch screen panel having varied combinations of resolution and touch sensitivity. The touch screen panel may also incorporate display functionality. For a first embodiment of the invention, the majority of the screen area exhibits low resolution, high touch force characteristics. This large area might be used for highlighting and simple annotation, thereby minimizing processor bandwidth and providing rejection of inadvertent touchings. A smaller area of the screen exhibits low touch force and high resolution properties. This smaller area may be used for digital signature input or for security marking input. The smaller area may be placed in a corner of the screen where it is unlikely to be inadvertently touched. For a second embodiment of the invention, the peripheral regions (i.e., regions near the circumferential edge) of the screen are provided with regions of high-resolution, low-touch-force properties. These regions may be programmed to act as scroll bars, which would allow the user to change locations in a document when only a portion of the document is displayed on the screen. In the central regions of the screen, lower-resolution, higher-touch-force properties provide palm rejection and coarse marking or movement capability with low bandwidth utilization.

Either the varied screen properties may be incorporated into the screen during its manufacture, or the screen may be designed so that the varied properties are programmable by the user. In order to provide regions on the display screen of different resolution during the manufacturing process, several approaches are possible. One approach requires the fabrication of a smaller screen within the larger screen, with both the smaller and larger screens having their own dedicated sensing and scanning circuitry. Different properties are incorporated into the circuitry of each screen. Another approach utilizes the same scanning circuitry for both high and low-resolution regions of the screen. The screen is manufactured in such as manner so as to either accommodate high-resolution touch sensing over the entire area of the screen or only in certain preset regions. If the entire screen can accommodate high-resolution touch sensing, then the system is programmed to use low-resolution scanning as the default operational condition. When scanning in the high-resolution mode, every sensing element is scanned. However, when operating in the low-resolution scanning mode, only a fraction of the sensing elements are scanned. When a touch input is sensed in the designated high-resolution regions, the system immediately switches to high-resolution scanning. High-resolution scanning is maintained until the system senses a touch input in a low-resolution region of the screen, at which time the system reverts to low-resolution scanning. It should be readily apparent that multiple scanning modes can be hard-wired into the screen's scanning circuitry at the time of manufacture or the screen can be manufactured so that the scanning modes are programmable. Still another approach to providing for low and high-resolution detection is through the use of a balance detection system, such as that employed in the referenced patent to Gerpheide, et al. Balance detection circuitry can be activated when a touch input is sensed in the a designated high-resolution region, and deactivated when a touch input is sensed in a designated low-resolution region.

Although programmable region-specific resolution may be readily implemented for most types of touch screen panels, only certain types of touch-sensitive panels may readily incorporate programmability for touch sensitivity. As a general rule, touch sensitivity programmability may be implemented for only those displays for which a touch input results in an analog signal which varies in strength in proportion to the touching force or proximity of an object to a sensing element.

Certain improvements may also be made to existing screen designs to provide both programmability of sensitivity and areas of varying sensitivity at the time of manufacture. For example, screens constructed in accordance with either the cited Herbert patent or the Gerpheide, et al. patent may be modified by incorporating a resilient, compressible layer. The compressible nature of the layer will result in an analog screen output signal. Additionally, a resilient, compressible layer having regions of varied thickness may be incorporated in either screen at the time of manufacture to provide different levels of touch sensitivity.

DETAILED DESCRIPTION OF THE INVENTION

This invention includes a touch screen panel having varying combinations of resolution and touch sensitivity. The varying screen properties may be either manufactured into the screen, or programmed by the user. Screen configuration will be discussed first, followed by a description of the changes which must be effected to produce a touch screen display panel having the desired resolution and touch force characteristics. The touch screen panel may also incorporate display functionality.

Certain types of screens, such as those of Fujita, et al. and Herbert, incorporate both display and touch detection in a single array of elements. Other types of screens may require two superimposed arrays: one for the visual display, and the other for touch detection. For example, if the touch pad of Gerpheide, et al. is used as an overlay for a conventional liquid crystal display screen, any conductors within the touch pad overlay should, preferably, be transparent in order to avoid at least a partial blocking of displayed images. Induim tin oxide is presently the preferred material for transparent solid conductors.

Figure 1:
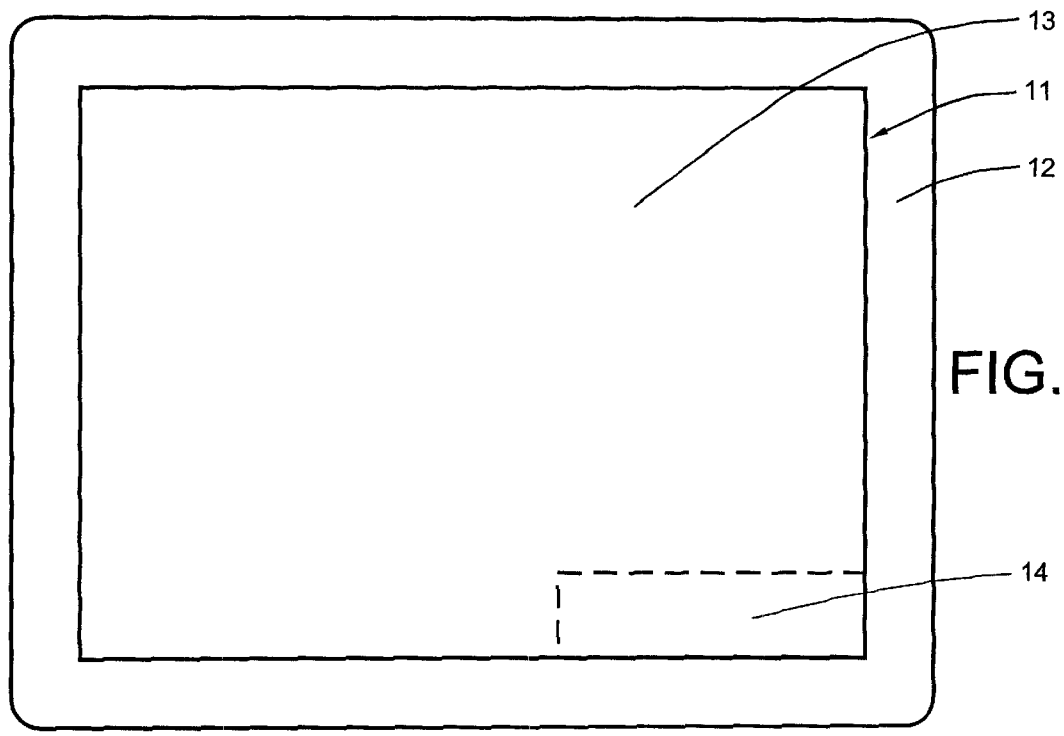
FIG. 1 is a top plan view of a touch-screen display that, except for a lower right portion which has high-resolution, low-touch-force properties, has low resolution, high touch force characteristics.

For a first embodiment of the invention shown in FIG. 1, a touch and/or display screen 11 is mounted in within a display housing 12. The screen 11 is divided into two regions having different properties. The first region 13 incorporates the majority of the total display area of the screen 11. The first region 13 exhibits low resolution, high touch force characteristics. This large first region 13 might be used for annotating documents or highlighting certain portions of documents displayed on the screen 11, thereby minimizing processor bandwidth and providing rejection of inadvertent touchings. By minimizing processor bandwidth, memory requirements are reduced and screen updates can be performed more rapidly. A smaller second region 14 of screen 11 exhibits low-touch-force and high-resolution properties. This second region 14 may be used for digital signature input or for security marking input. It will be noted that the second region 14, which is at least an order of magnitude smaller in area than said major region, has been placed in a corner of the screen 11 where it is unlikely to be inadvertently touched.

Figure 2:
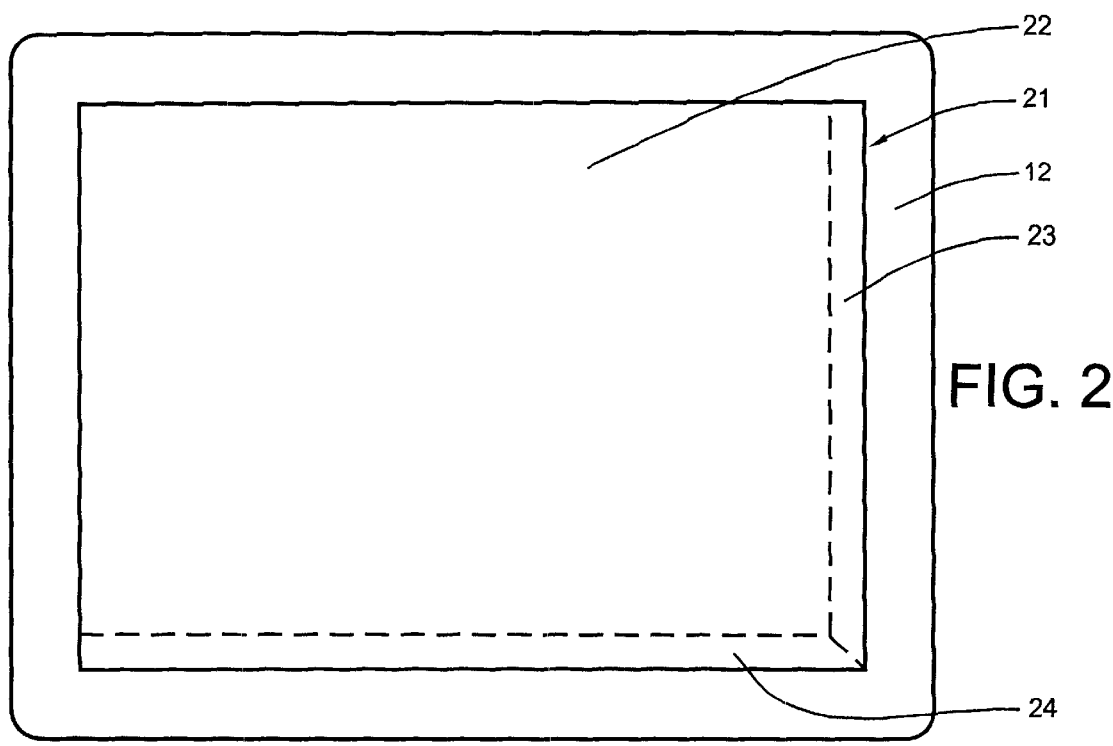
FIG. 2 is a top plan view of a touch-screen display that, except for narrow strips along the lower and right edges which have high-resolution, low-touch-force properties, has low resolution, high touch force characteristics.

For a second embodiment of the invention shown in FIG. 2, a touch and/or display screen 21 is divided into three regions. The first region 22 incorporates the majority of the total display area of the screen 21. The first region 22 exhibits low-resolution, high-touch-force characteristics. This large first region 22 might be used for annotating documents or highlighting certain portions of documents displayed on the screen 21. The second and third regions 23 and 24, respectively, are narrow bands along the right and bottom peripheral edges of the screen 21 which have high-resolution, low-touch-force characteristics. The second region 23 may be programmed to act as a vertical scroll bar, while the third region 24 may be programmed to act as a horizontal scroll bar. Scroll bars are typically used to scroll within a document, drawing, or other screen display that is too large to fit on a single screen.

Either the varied screen properties may be incorporated into the screen during its manufacture, or the screen may be designed so that the varied properties are programmable by the user. In order to provide regions on the display screen of different resolution during the manufacturing process, two basic approaches are possible. The first approach requires the fabrication of a smaller screen within the larger screen, with both the smaller and larger screens having their own dedicated sensing and scanning circuitry. Different properties are incorporated into the circuitry of each screen. For screens which sense location and movement through the presence of discrete switches, a greater number of switches are incorporated into the high-resolution regions of the screen. For a screen which senses location and movement with an array of capacitive devices, a greater number of such devices are incorporated into the high-resolution regions of the screen. For example, if the array utilizes perpendicularly overlapping arrays of parallel conductor strips, then the number of conductor strips per centimeter is increased in one or both arrays for high-resolution regions. The second approach utilizes the same scanning circuitry for both high and low-resolution regions of the screen. The screen is manufactured in such as manner so as to either accommodate high-resolution touch sensing over the entire area of the screen or only in certain preset regions. If the entire screen can accommodate high-resolution touch sensing, then the system is programmed to use low-resolution scanning as the default operational condition. When scanning in the high-resolution mode, every sensing element is scanned. However, when operating in the low-resolution scanning mode, only a fraction of the sensing elements are scanned. For example, if the low-resolution mode operates at one fourth the resolution of the high-resolution mode, every other horizontal sensing element and every other vertical sensing element would be scanned during low-resolution operation. When a touch input is sensed in the designated high-resolution regions, the system immediately switches to high-resolution scanning. High-resolution scanning is maintained until the system senses a touch input in a low-resolution region of the screen, at which time the system reverts to low-resolution scanning. It should be readily apparent that multiple scanning modes can be hard-wired into the screen's scanning circuitry at the time of manufacture.

The touch pad of Gerpheide, et al. (U.S. Pat. No. 5,861,875) employs capacitive balance to more accurately determine the position of a touching object. This feature, in essence, provides resolution greater than the spacing between capacitive electrodes. As an ample description of its implementation is given in the patent with reference to FIGS. 10(*a*), 10(*b*), 11 and 12, that description is incorporated herein by reference. Using the capacitive balance method, there is, of course, a maximum obtainable resolution. However, balance sensitivity may be reduced below the maximum level to reduce resolution, if so desired. Modifications to balance sensitivity may be made using software, or the setting may be hardwired into the touch pad system.

It should also be readily apparent that the provision of multiple scanning modes lends itself to user programmability. An embodiment of this invention is the provision of scanning circuitry which is programmable by the user to accommodate his own unique needs.

Although touch sensitivity is readily adjustable during the design of a touch screen, programmability of touch sensitivity is more complicated. Generally speaking, only certain types of touch-sensitive panels may incorporate programmability of touch sensitivity. As a rule, touch sensitivity programmability may be implemented for only those displays where a touch input results in an analog signal which varies in strength in proportion to the touching force. For example, the Eachus, et al. device of U.S. Pat. No. 4,013,835 and the Fujita, et al. device of U.S. Pat. No. 5,122,787 lend themselves to programmability, as the threshold for detecting a touching input may be adjusted within a fixed range of values. Thus, in accordance with the present invention, touch sensitivity can be varied from one region of the screen to another by adjusting the capacitive coupling threshold value to a higher level when touch inputs are made to one region than when made to another region.

Figure 3:
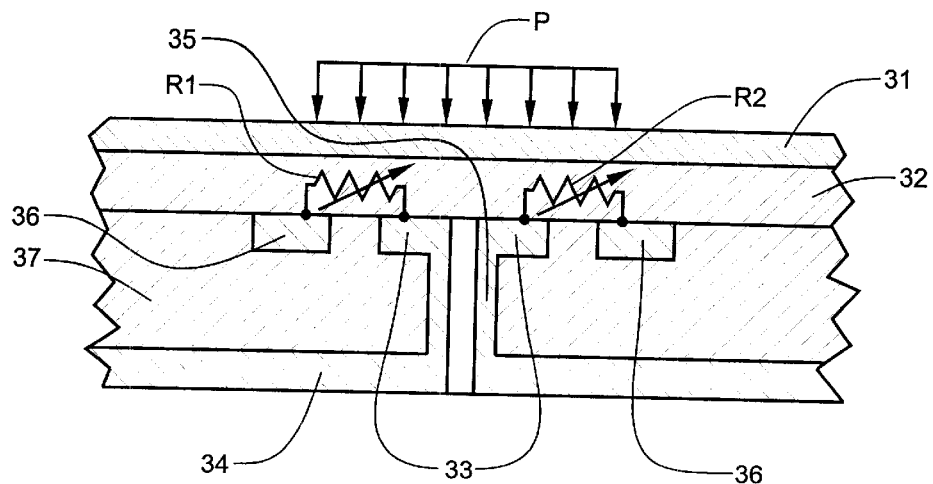
FIG. 3 is a cross-sectional view of a first prior-art touch-screen display (Eachus, et al.)
Figure 4:
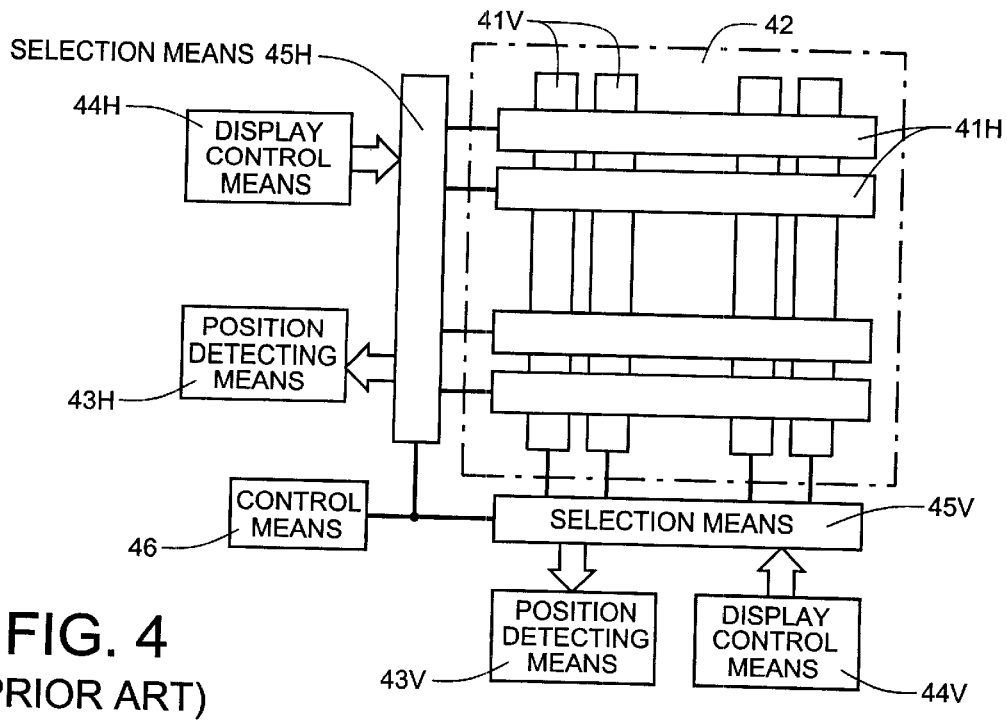
FIG. 4 is a cross-sectional view of a second prior-art touch-screen display (Fujita, et al.)
Figure 6:
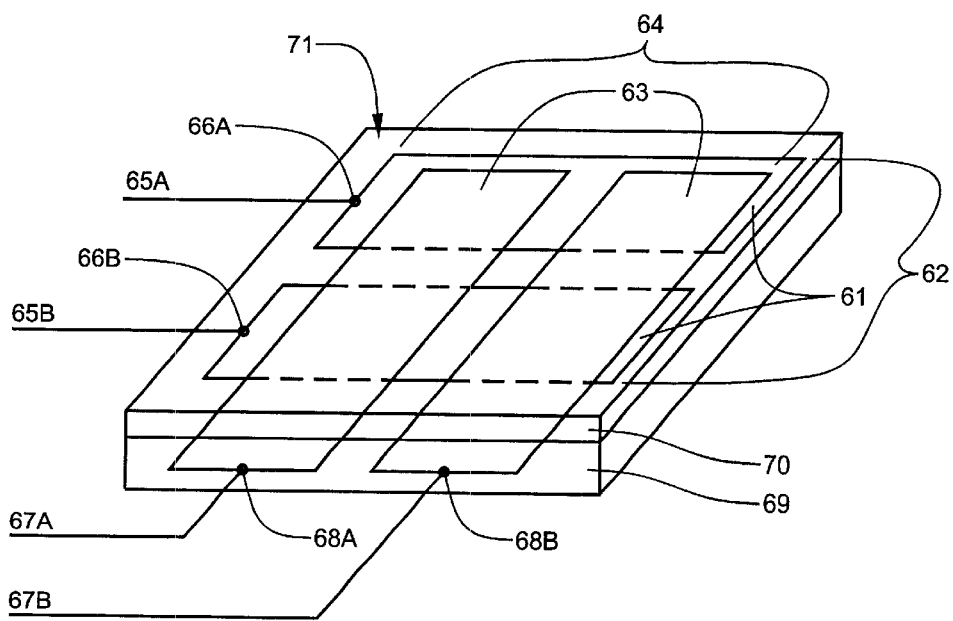
FIG. 6 is a cross-sectional view of a modified fourth prior-art touch-screen display of Gerpheide, et al., which now incorporates a resiliently compressible pad in order to provide touch sensitivity.

The Eachus, et al. device is shown in FIG. 3, which corresponds to FIG. 6 of U.S. Pat. No. 4,013,835. The touch pad is constructed from a tough, flexible, transparent insulating layer 31, which overlies a resilient coupling layer 32, the resistance of which varies inversely with the pressure applied to it. A contact pad 33 in physical contact with the coupling layer 32 is in electrical contact with a Y-axis conductor 34 via a plated hole conductor 35. An open rectangular conductor 36, embedded within a dielectric material layer 37 is also in physical contact with the coupling layer 32. Electrical paths between the rectangular conductor 36, which is coupled to an X-axis conductor, and the contact pad 33 are formed by applying pressure (P) to the coupling layer 32 in the region of the rectangular conductor and contact pad 33. The Fujita, et al. device is shown in FIG. 4, which corresponds to FIG. 1 of U.S. Pat. No. 5,122,787. A ferroelectric liquid crystal layer 42 is sandwiched between transparent counterposed electrodes 41H and 41V, which constitute a matrix. Position detecting means 43H and 43V, which may be implemented as voltage detecting operational amplifiers, are provided for detecting a pushed position through electrodes 41H and 41V by an electromotive force generated between those electrodes when an upper surface of the matrix is pushed. Display control means 44H and 44V, which may be implemented as driver circuits, are provided for controlling the display state of the liquid crystal panel through electrodes 41H and 41V. Selection means 45H and 45V, which may be implemented as array-like switching elements, are provided for selecting the connection of the position detecting means 43H and 43V and control means 44H and 44V to electrodes 41H and 43V, respectively, in a time-sharing manner. When position detecting means 43H and 43V are connected to electrodes 41H and 41V, respectively, by selection means 45H and 45V, also respectively, the connection of the display control means 44H and 44V to electrodes 41H and 41V is cut off. Conversely, then the display control means are connected to electrodes 41H and 41V by selection means 45H and 45V, the connection of position detecting means 43H and 43V to electrodes 41H and 41V is cut off. A further control means 46 is provided for sending control signals to selection means 45H and 45V.

The Meadows, et al. device of U.S. Pat. No. 4,698,461 and the Edwards device of U.S. Pat. No. 5,194,862, on the other hand, do not lend themselves to touch sensitivity programmability, as the detection devices for each of these input screens provide a digital signal.

Figure 5:
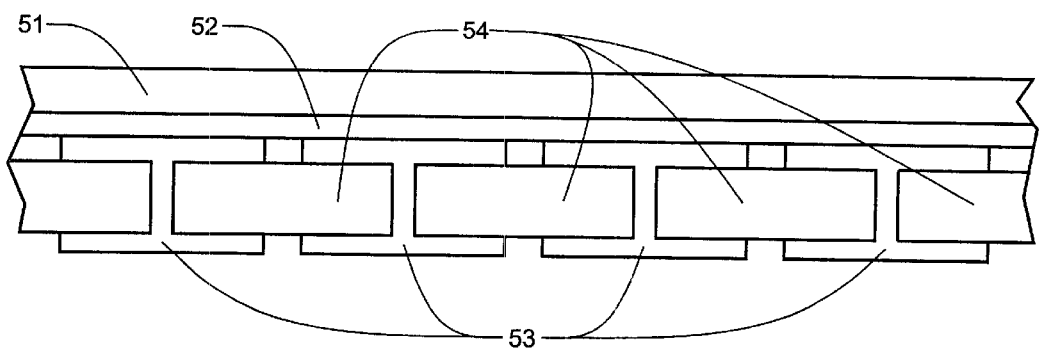
FIG. 5 is a cross-sectional view of a modified third prior-art touch-screen display (Herbert), which now incorporates a resiliently compressible pad in order to provide touch sensitivity.

Referring now to FIGS. 5 and 6, with the addition of a compressible resilient pad on top of a screen employing either the Herbert device of U.S. Pat. No 5,777,596 or the Gerpheide, et al. device of U.S. Pat. No. 5, 861,875, an analog signal will be output to sensing circuitry. FIG. 5, which corresponds to FIG. 3(C) of U.S. Pat. No. 5,777,596, shows a modified top panel glass of the Herbert display, modified in accordance with the present invention. The resilient pad 51 overlies the panel glass 52. Electrodes 53 have been embedded within the panel glass. Regions 54, though not clearly identified in the patent, are probably glass regions diffused with a conductive dopant. FIG. 6, which corresponds to FIG. 4 of U.S. Pat. No. 5,861,875, shows the Gerpheide, et al. device, modified in accordance with the present invention. Two row virtual electrodes 61 form a row virtual dipole electrode 62, while two column virtual electrodes 63 form a column virtual dipole electrode 64. Each of the dipoles so formed have positive and negative halves. Capacitive measurements for the negative row virtual dipole electrode are taken at connection 68A through conductor 67A, while measurements for the positive row dipole electrode are taken at connection 68B through conductor 67B. Similarly, measurements of the negative column virtual dipole are taken at connection 66A through conductor 65A, and measurements of the positive column virtual dipole are taken at connection 66B through conductor 65B. A resilient compressible pad 70 has been added to the Gerpheide, et al., device. As the resilient pad 70 is compressed by a finger or stylus, the amplitude of the measured capacitance value will increase over a static reference value in proportion to the force applied to the resilient pad. Thus, the closer the finger or stylus to the sensing cells or capacitive grid of the input screen, the greater the variance from an untouched state reference value. By providing for a software adjustable vertical distance detection threshold value, touch sensitivity may be varied. Thus, with such a modification, a screen built according to either Herbert or Gerpheide, et al., may incorporate programmability of touch sensitivity. Alternatively, regions having differing levels of touch sensitivity may be incorporated in a screen built according to either Herbert or Gerpheide, et al. by incorporating a resilient pad, 51 or 70, of varying thickness. In regions where the resilient pad is thicker, greater force will be required to provide the same touch response achieved in regions where the resilient pad is thinner.

Suffice it to say that although all touch screen types do not lend themselves to programmability of touch sensitivity, most types may incorporate regions of varied touch sensitivity at the time of manufacture.

Although only several embodiments of the invention have been heretofore described, it will be obvious to those having ordinary skill in the art that changes and modifications may be made thereto without departing from the scope and the spirit of the invention as hereinafter claimed.

What is claimed is:

1. A touch-sensitive screen for providing data input to a data processing system, said touch-sensitive screen comprising:
   a major screen region; at least one contiguous, non-overlapping minor screen region, said minor screen region having different touch and different force detection resolution properties than said major screen region, each screen region responsive to a touch input of a finger or stylus in that region; and
   a matrix of touch sensing elements which are periodically scanned both horizontally and vertically in order to detect changing x and y positions of a touch input, and wherein the resolution is varied between screen regions by varying the percentage of sensing elements scanned during a single scanning operation in response to a determination of in which region the touch input has occurred.

2. The touch-sensitive screen of claim 1, wherein said screen incorporates image display capability.

3. The touch-sensitive screen of claim 1, wherein said minor screen region has higher resolution and responds to a lower touch force threshold than said major screen region.

4. The touch-sensitive screen of claim 3, wherein said minor region is in located in a corner of said screen.

5. The touch-sensitive screen of claim 3, wherein said minor region is about an order of magnitude smaller in area than said major region.

6. The touch-sensitive screen of claim 1, where a first minor region is positioned along a horizontal edge of said screen and a second minor region is positioned along a vertical edge of said screen.

7. The touch-sensitive screen of claim 6, wherein each of said minor regions possesses higher resolution than said major region, and each minor region is functionable as a scrollbar.

8. The touch-sensitive screen of claim 1, wherein touch inputs are detected by position detection elements formed from overlapping first and second arrays of parallel conductor strips, which are embedded within the screen and parallel to an upper touchable surface, the strips of said first array being positioned perpendicular with respect to the strips of said second array and dielectrically insulated therefrom.

9. The touch-sensitive screen of claim 8, wherein each of said conductor strips is formed from indium tin oxide and the screen incorporates display functionality.

10. The touch-sensitive screen of claim 8, wherein resolution of an object's position on the touchable surface may be enhanced by means of capacitive balance circuitry, which is activated when a touch input is made to one region of the screen, but deactivated when made to another region.

11. The touch-sensitive screen of claim 10, wherein said resolution may be progammably varied by a user.

12. The touch-sensitive screen of claim 8, wherein touch sensitivity is variable between regions by adjusting a capacitive coupling threshold value to a higher level when touch inputs are made to one region than when made to another region.

13. The touch-sensitive screen of claim 12, wherein touch sensitivity is programmably varied by a user.

14. The touch-sensitive screen of claim 8, which further comprises a resilient layer overlying the face of the screen which is compressible to increase capacitive coupling between an object touching the screen and said position detection elements.

15. A touch-sensitive display screen for providing data input to a data processing system, said screen comprising:
   a major screen region and at least one minor screen region, said minor screen region having different resolution and touch force detection properties than said major screen region;
   a matrix of touch sensing elements which are periodically scanned both horizontally and vertically in order to detect changing x and y positions of a touch input; and
   wherein resolution is varied between regions by varying the percentage of sensing elements scanned during a single scanning operation in response to a determination of in which region the touch input has occurred.

16. The touch-sensitive display screen of claim 15, wherein said minor screen region has higher resolution and responds to a lower touch force threshold than said major screen region, and is located in a corner of said screen.

17. The touch-sensitive screen of claim 15, wherein a first minor region is positioned along a horizontal edge of said screen and is programmed to function as a horizontal scrollbar, a second minor region is positioned along a vertical edge of said screen and is programmed to function as a vertical scrollbar, and each minor region has higher resolution and responds to a lower touch force threshold than said major screen region.

18. The touch-sensitive screen of claim 15, wherein touch inputs are detected by position detection elements formed from overlapping first and second arrays of parallel, substantially transparent conductor strips, which are embedded within the screen and parallel to an upper touchable surface, the strips of said first array being positioned perpendicular with respect to the strips of said second array and dielectrically insulated therefrom.

19. The touch-sensitive screen of claim 18, wherein resolution of an object's position on the touchable surface may be enhanced by means of capacitive balance circuitry, which is activated when a touch input is made to one region of the screen, but deactivated when made to another region of the screen.

20. The touch-sensitive screen of claim 19, wherein said resolution may be programmably varied by a user.

21. The touch-sensitive screen of claim 18, wherein touch sensitivity is variable between regions by adjusting a capacitive coupling threshold value to a-higher level when touch inputs are made to one region than when made to another region.

22. The touch-sensitive screen of claim 21, wherein touch sensitivity is programmably variable by a user.

23. The touch-sensitive screen of claim 18, which further comprises a resilient layer overlying the face of the screen which is compressible to increase capacitive coupling between an object touching the screen and said position detection elements.

* * * * *